Jan. 1, 1946.  C. M. OSTERHELD  2,392,177
WATER HEATER CONTROL SYSTEM
Filed Oct. 15, 1943  2 Sheets-Sheet 1
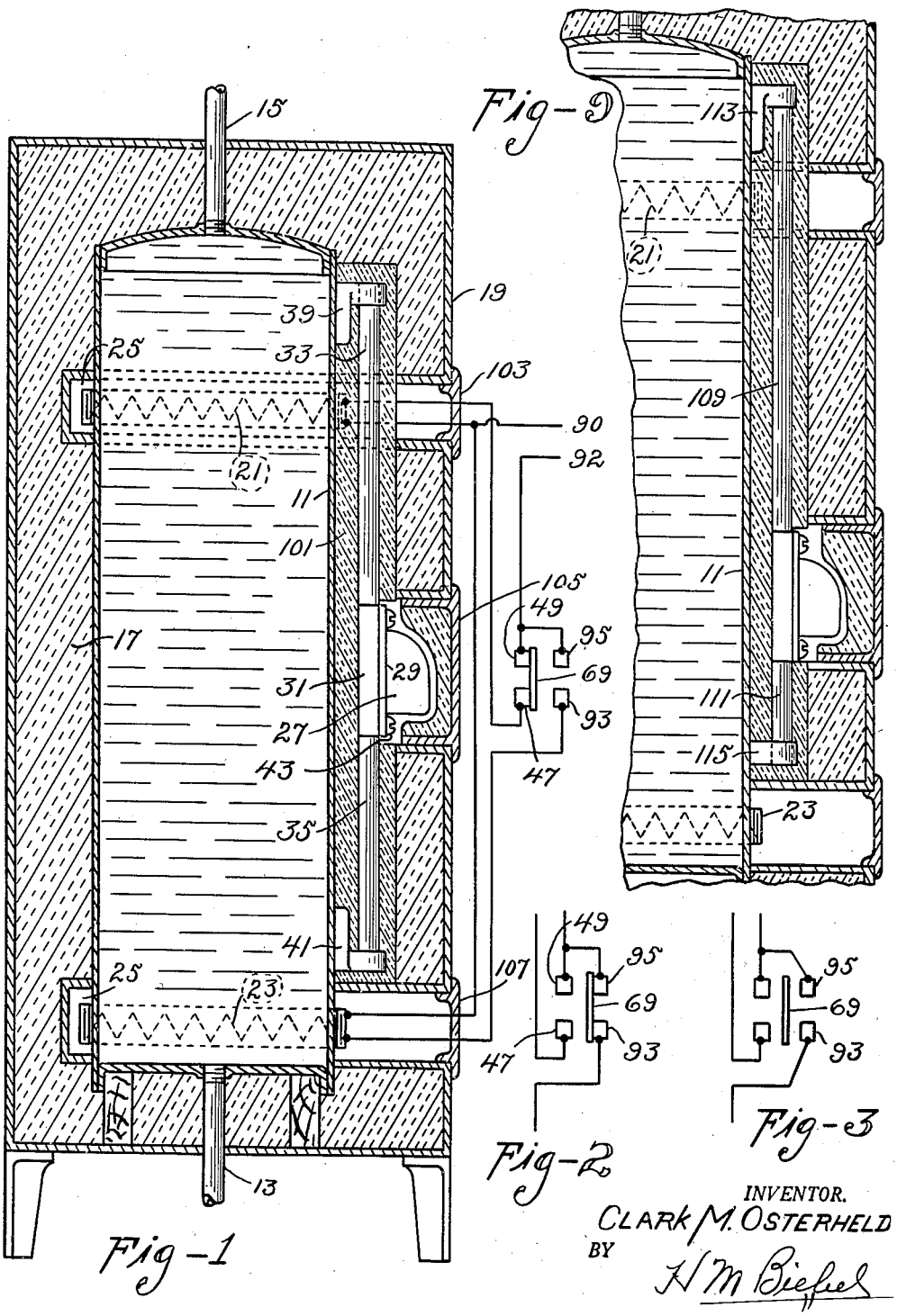
INVENTOR.
CLARK M. OSTERHELD
BY
ATTORNEY Jan. 1, 1946.  C. M. OSTERHELD  2,392,177
WATER HEATER CONTROL SYSTEM
Filed Oct. 15, 1943  2 Sheets-Sheet 2
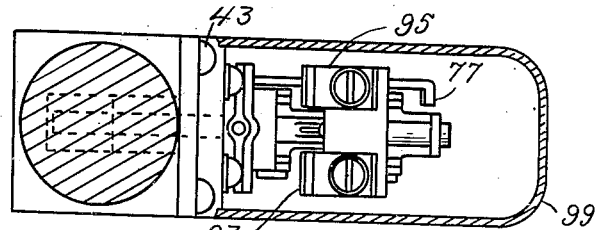
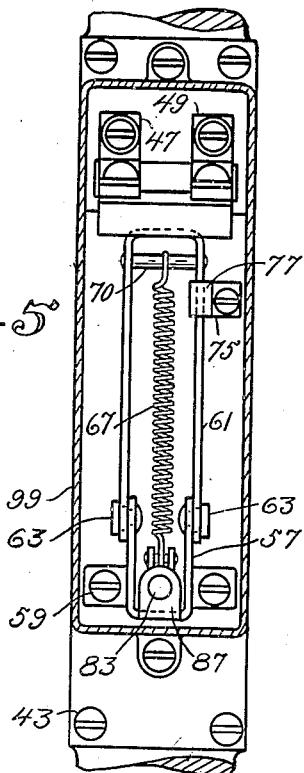
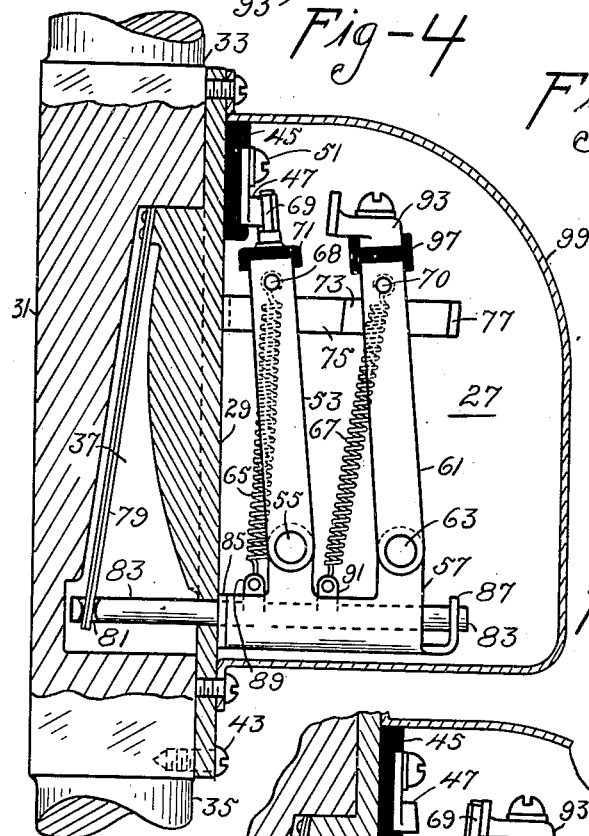
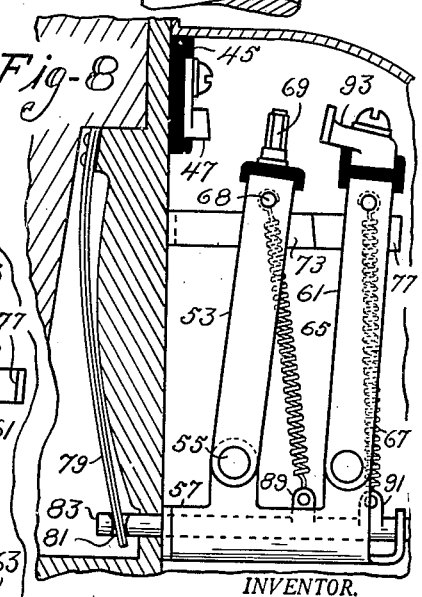
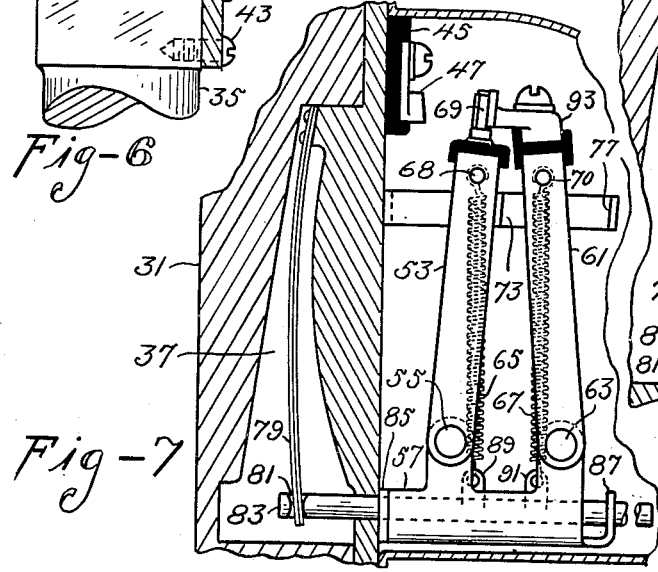
INVENTOR.
CLARK M. OSTERHELD
BY
ATTORNEY Patented Jan. 1, 1946

2,392,177

UNITED STATES PATENT OFFICE 2,392,177

WATER HEATER CONTROL SYSTEM

Clark M. Osterheld, Stoughton, Wis., assignor to McGraw Electric Company, Elgin, Ill., a corporation of Delaware Application October 15, 1943, Serial No. 506,449

19 Claims. (Cl. 219—39)

My invention relates to electric heating and particularly to electric water heating systems.

An object of my invention is to provide a relatively simple multiple-contact, multiple-position switch adapted to be controlled by members constituting heat flow paths and respectively secured to the upper and to the lower end portions of a hot water tank to control the energization of upper and of lower electric heaters mounted on the tank.

Another object of my invention is to provide a heater control system which will energize only the upper heater on a tank when the tank is first filled with cold water, will then deenergize the upper heater and energize the lower heater when a predetermined amount of water has been heated in the upper part of the tank and will thereafter deenergize the lower heater when substantially all of the water in the tank is hot.

Another object of my invention is to provide a single thermally-actuable control switch for a plurality of electric heaters on a hot water tank to effect selective energization of the heaters under predetermined conditions of demand for hot water.

Another object of my invention is to provide a single thermally-actuable switching means mountable on a tank intermediate the ends thereof and controlled jointly and simultaneously by temperature conditions adjacent the end portions of the tank.

Another object of my invention is to provide a single thermally-actuable switch adapted to be mounted on a tank at any desired portion thereof, to selectively control the energization of electric heaters for applying heat to different portions of the tank in accordance with the temperature of the water in those respective portions of the tank.

Other objects of my invention will either be apparent from a description of one form of my invention now preferred by me or will be pointed out in the description and particularly set forth in the appended claims.

In the drawings,

Figure 1 is a sectional view of a domestic hot water tank with a diagram of an electric circuit embodying my invention showing contacts in position occupied by them when the tank is full of cold water, Fig. 2 is a fragmentary diagram of an electric circuit showing the position of the contacts when the water in the upper portion of the tank is heated and the water in the lower portion is cold, Fig. 3 is a fragmentary diagram of the electric circuit showing the position of the contacts when all of the water in the tank is hot, Fig. 4 is a top plan view of the parts shown in Fig. 6 with a section through the upper part of the cover, Fig. 5 is a front elevational view of Fig. 6 with cover shown in section, Fig. 6 is a vertical sectional view of a thermal controlled switch with the positions of the contacts the same as that shown in Fig. 1, Fig. 7 is a fragmentary view of Fig. 6 with the contacts shown in the position occupied by them in Fig. 2, Fig. 8 is the same as Figs. 6 and 7 except that the contacts are shown in the same position as in Fig. 3, and, Fig. 9 is a fragmentary view similar to Fig. 1 showing a different position for the control switch.

My improved control system is particularly useful for the control of an upper and a lower electric heater mounted on or in the upper end portion and the lower end portion of the usual domestic hot water tank; the main object being to permit of energizing only one of said heaters at any time.

I have shown a domestic hot water tank 11 as provided with a lower cold water inlet 13 and an upper hot water outlet 15, a mass of heat-insulating material 17 therearound held in proper operative position by an outside cover 19. All of these elements thus far mentioned are as have been used in the art.

I provide an upper electric heater 21 and a lower electric heater 23 which may either surround the tank and be electrically insulated therefrom and as shown these heaters may be positioned in tunnels 25 all in a manner now well known in the art, or may be positioned inside the tank.

In order to selectively control the energization of the heaters 21 and 23 I provide a single plural-contact, plural and specifically a triple-position switch which I have designated generally by numeral 27. The switch 27 includes a metallic base 29 which may be of substantially rectangular form in outline and which is adapted to be secured against the mid-portion 31 of a pair of heat-transmitting or heat-flow rods or members 33 and 35 respectively, having a recess 37 in its front surface. The upper end portion of rod 33 has sliding but relatively tight fit into a supporting bracket 39 which may be of substantially L-shape and have the vertical arm thereof in good heat-receiving and heat-transmitting contact with the outside of the tank at substantially the uppermost portion thereof occupied by the water. Bracket 39 may be made of a material, such as copper, having high heat conductivity. Similarly the lower heat transmitting rod 35 is supported in a bracket 41 also of L-shape having the vertically extending arm thereof in good heat-receiving position against the outside of the tank near the bottom portion thereof. As illustrative only I may weld or braze the arm portions 41 and 39 against the outside of the tank. The upper and lower ends of base 29 may be secured against the intermediate portion 31 by sets of screws or machine bolts 43 with a relatively large area of engaging surfaces.

On base member 29 adjacent to the upper end portion thereof I provide a block 45 of electric-insulating material having mounted thereon a pair of contact terminals 47 and 49. Short machine screws 51 may be utilized to hold the terminals 47 and 49 against the block 45 which latter, in turn, may be secured against support 29 in any suitable or desired manner.

I provide a first pivotally mounted lever arm 53 which may be of substantially inverted U-shape and may be pivotally supported as by pivot pins 55 on left-hand upwardly-extending portions of a bracket 57, one end of which may be suitably secured as by short machine screws 59 against the front surface of support 29. I provide further a second pivotally supported lever arm 61 which may be supported as by pivot pins 63 on the right-hand upwardly-extending end portions of bracket 57. I provide an over center spring 65 to control the position of arm 53 and I provide an over center spring 67 to control the position of the second arm 61, the upper ends of these springs being connected to cross bars 68 and 70.

The pivotal movement of arms 53 and 61 respectively is limited by a contact bridge member 69 insulatedly mounted on the upper end of lever arm 53, an electric-insulating block 71 being provided to suitably electrically insulate the bridging member 69 from arm 53. When the arm 53 has been moved to the position shown in Fig. 6 of the drawings the contact bridging member 69 will be in electrical contact with the lower end portions of terminals 47 and 49. Movement of arm 53 in a right-hand direction, as seen in Fig. 6, is limited by a stop portion 73 in a stop member 75 which has in addition to the stop 73 limiting the movement in a left-hand direction of the second arm 61, a stop 77 for limiting the movement of arm 61 in a right-hand direction.

Means for causing movement of the lower ends of springs 65 and 67 includes a thermally-actuable element 79 here shown as of bimetal having its upper end in close heat-receiving fixed engagement with a part of support 29 while its lower end fits into an opening 81 in a rod or bar 83 which has linear movement in a right-hand and a left-hand direction, being supported by a left-hand end portion 85 of bracket 57 and a right-hand end portion 87 thereof. Rod 83 is provided with laterally extending lugs 89 and 91 spaced from each other to receive the lower ends of the respective coil springs 65 and 67.

When the tank is first filled with cold water at a temperature on the order of 70° F. the temperature of the bimetal bar 79 will also be on that order although, of course, somewhat lower, and its position will be substantially that shown in Fig. 6. The contact bridging member 69 will be in electric conducting engagement with contacts 47 and 49 with the result that the upper heater only will be energized from supply circuit conductors 90 and 92 as may be noted from the diagram of electric connections shown in Fig. 1.

When the temperature of the water in the upper end portion of the tank has reached a predetermined relatively high value, say on the order of 170° F., the amount of heat flowing into the upper heat-flow-path rod 33 through bracket 39 and reaching the thermal element 79 is enough to cause flexing of the bimetal bar 79 to substantially the position shown in Fig. 7 of the drawings with resultant movement of rod 83 in a right-hand direction so that the bridging member 69 will electrically contact with two terminals 93 and 95 insulatedly mounted on the upper movable end portion of lever arm 61, the terminals 93 and 95 being electrically insulated from metallic arm 61 by a block 97 of electric-insulating material. It may be noted that the rod 83 is moved in a right-hand direction only enough so that the over center spring 65 is moved past the pivot points 55 to thereby cause turning movement of arm 53 in a clockwise direction until arm 53 is stopped by contact members 93 and 95, such movement occurring with a snap action.

If now the lower heating element be energized to heat the water in the lower portion of the tank heat will flow from the hot water in the lower end portion of the tank into supporting bracket 41 and upwardly through the lower heat-flow-path rod 35 causing an increase in temperature of the bimetal bar 79 until the bimetal bar flexes into substantially the position shown in Fig. 8 of the drawings when the second lever arm 61 will be caused to move against stop 77 and out of electrical contact and engagement with contact bridging member 69. Arm 53 is moved against stop lug 73 simultaneously with this movement of the second arm 61. This will cause deenergization of the lower heater 23 and the design, construction and adjustment of the plural-contact, triple-position control switch 27 is such that when the upper heater is first energized after the tank has been filled with cold water the upper heater alone will be energized, this energization continuing until enough hot water in the upper portion of the tank has been heated to a predetermined temperature, say on the order of 170° F., whereupon the amount of heat reaching the thermal element 79 is enough to cause movement of rod 83 a sufficient amount to cause a tilting movement of arm 53 out of engagement with the upper contacts 47 and 49, and into engagement with contacts 93 and 95 on the second lever arm 61.

Energization of the lower heater 23 thereafter will result in added flow of heat to the thermal element 79 from bracket 41 and through rod 35 until bimetal bar 79 is further flexed a sufficient amount to move rod 83 sufficiently to cause a tilting movement of lever arm 61 in a right-hand direction to move contacts 93 and 95 out of engagement with contact bridging member 69 and move the lever arm into engagement with stop 77.

I may provide a housing 99 around the switch 27 and I may further provide additional heat-insulating material 101 to suitably protect the two heat-flow-paths hereinbefore described from the effects of ambient air. As shown in Fig. 1 of the drawings I may provide closure members 103 for a front opening in the upper tunnel 25, a cover 105 for the switch and a cover 107 for an opening in the lower tunnel 25.

I have illustrated a thermally-actuable single control switch 27 as being supported at substantially the mid-portion of the height of a domestic hot water tank and I wish to here point out that preferably the lengths of the vertical arms of the brackets 39 and 41 are substantially the same so that if we assume that the initial temperature of water entering the tank is 70° and the desired maximum temperature of the water when hot is 170°, the temperature of the bimetal or thermal element will be on the order of 120° F. when the top temperature of the water in the top portion of the tank to which bracket 39 is subject has been reached. If now the lower heater is energized until substantially all of the water in the tank has been heated to 170°, it is evident that the thermal element 79 will have also reached a temperature substantially on the order of 170°.

If now hot water is withdrawn from the tank to an amount sufficient to subject lower bracket 41 to the temperature of cold water, the original hereinbefore described conditions of the upper bracket being subject to hot water at a temperature of 170° while the lower bracket 41 is subject to water at a temperature of 70° will re-occur and the bimetal bar 79 will then move from the position shown in Fig. 8 of the drawings to that shown in Fig. 7 of the drawings whereby the lower heater is again energized all as hereinbefore described.

The parts embodying my improved control system are therefore operative to initiate heating of the water in the tank by the upper heater only when the tank is first filled with cold water said energization of the upper heater continuing until the temperature of the water in the upper end portion of the tank has reached say 170° F., whereupon the upper heater is deenergized and the lower heater is energized, energization of the lower heater continuing until substantially all of the water in the tank has been heated to say 170° F. whereupon energization of the lower heater is interrupted.

It is therefore obvious that my new and improved water heater control system is effective to permit energization of only a single electric heater at a time, the upper heater being first effective to cause heating of a relatively small amount of water in the upper portion of the tank while the lower heater is effective to cause heating of substantially all the rest of the water in the tank to a desired high temperature.

Referring now to Fig. 9 of the drawings I have there shown a modification of the mounting of my improved plural-contact triple-position switch in which the upper heat flow path is constituted by a relatively long rod 109 while the lower heat-flow-path is constituted by a short rod 111. The upper bracket 113 may be of substantially the same dimensions and shape as bracket 39 but in order to obtain substantially the same thermal reluctance from the lower portion of the tank to the switch a bracket 115 supporting the lower rod 111 may be a metallic arm substantially as shown in the lower portion of Fig. 9 of the drawings. The small area of contact between bracket 115 and the outer surface of the tank 11 will introduce a greater thermal reluctance, which added to the reduced thermal reluctance of rod 111 will tend to equalize the thermal reluctance of the two paths, first that from the upper end portion of the tank to the switch and second that from the lower end portion of the tank to the switch.

In order to be able to vary the amount of water heated by the upper heater before it is deenergized, I may vary the thermal reluctance of the upper heat path including bracket 39 and rod 33. Thus the bracket 39 may be made of stainless steel, which has relatively greater thermal reluctance than does copper or brass. Or the tank-engaging surface of bracket 39 may be reduced as is shown for bracket 115 in Fig. 9. When this is done the amount of water which must be heated by heater 21 must be increased before heater 21 will be deenergized by switch 27.

I am aware of other control systems effective for the same purpose but in these a thermally-actuable switch is provided for the upper heater which controls both heaters and a thermally-actuable switch for the lower heater. In contradistinction to this my system provides a single thermally-actuable switch which is thermally controlled by a pair of heat-flow-paths, preferably in the shape of say copper or aluminum rods, the inner ends of which either engage or support the thermally-actuable switch while the outer ends thereof are in heat-receiving engagement with the upper and the lower end portions of a domestic hot water tank.

I claim as my invention:

1. In a heater control system for a hot water tank having an upper and a lower electric heater, said system comprising a single plural-contact plural-position switch, a thermally-actuable means for operating said switch and a pair of heat-conducting members for affecting said thermally-actuable means in accordance with the temperature of the water in the respective end portions only of said tank.

2. In a heater control system for a hot water tank having an upper and a lower electric heater, said system comprising a single plural-contact plural-position switch, a thermally-actuable means for operating said switch and a pair of heat-conducting members for affecting said thermally-actuable means in accordance with the temperature of the water in the respective end portions only of said tank and effective to cause movement of said switch to a position to energize said upper heater only when the tank is full of cold water.

3. In a heater control system for a hot water tank having an upper and a lower electric heater, said system comprising a single plural-contact plural-position switch, a thermally-actuable means for operating said switch and a pair of heat-conducting members for affecting said thermally-actuable means in accordance with the temperature of the water in the respective end portions only of said tank and effective to cause movement of said switch to a position to energize said lower heater only when a predetermined part of the upper end of the tank is full of hot water.

4. In a heater control system for a hot water tank having an upper and a lower electric heater, said system comprising a single plural-contact plural position switch, a thermally-actuable means for operating said switch and a pair of heat-conducting members for affecting said thermally-actuable means in accordance with the temperature of the water in the respective end portions only of said tank and effective to cause movement of said switch to a position to deenergize both said heaters when the entire tank is full of hot water.

5. A heater control system for a hot water tank having an upper and a lower electric heater comprising a single plural-contact plural-position switch, a thermally-responsive means for actuating said switch and a pair of heat-conducting members having their respective outer end portions in thermal engagement with the upper and the lower end portions only of the tank and having their inner end portions in heat-conducting engagement with said thermally-responsive member to cause it to move said switch to a position to energize said upper heater only upon filling the tank with cold water.

6. A heater control system for a hot water tank having an upper and a lower electric heater comprising a single plural-contact plural-position switch, a thermally-responsive means for actuating said switch and a pair of heat-conducting members having their respective outer end portions in thermal engagement with the upper and the lower end portions only of the tank and having their inner end portions in heat-conducting engagement with said thermally-responsive member to cause it to move said switch to a position to energize said upper heater only upon filling the tank with cold water and for causing it to move said switch to a position to deenergize said upper heater and to energize said lower heater on heating of a predetermined quantity of water in the upper portion of the tank to a predetermined temperature.

7. A heater control system for a hot water tank having an upper and a lower electric heater comprising a single plural-contact plural-position switch, a thermally-responsive means for actuating said switch and a pair of heat-conducting members having their respective outer end portions in thermal engagement with the upper and the lower end portions only of the tank and having their inner end portions in heat-conducting engagement with said thermally-responsive member to cause it to move said switch to a position to energize said upper heater only upon filling the tank with cold water and for causing it to move said switch to a position to deenergize said upper heater and to energize said lower heater on heating of a predetermined quantity of water in the upper portion of the tank to a predetermined temperature and for causing it to move said switch to a position to deenergize the lower heater upon heating of all of the water in the tank to a predetermined temperature.

8. A water heater comprising a tank, electric heating units for the top and the bottom ends of the tank, a single thermally-actuable switching means and a pair of heat-flow-path member in thermal engagement with the top and the bottom ends only of the tank respectively and jointly thermally affecting said switching means to cause energization of the upper heater alone upon filling the tank with cold water and to cause deenergization of the upper heater unit and energization of the lower heater unit upon heating of a predetermined quantity of water in the top of the tank to a predetermined temperature.

9. A water heater comprising a tank, electric heating units for the top and the bottom ends of the tank, a single thermally-actuable switching means and a pair of heat-flow-path members in thermal engagement with the top and the bottom ends only of the tank respectively and jointly thermally affecting said switching means to cause energization of the upper heater alone upon filling the tank with cold water and to cause deenergization of the upper heater unit and energization of the lower heater unit upon heating of a predetermined quantity of water in the top of the tank to a predetermined temperature and to cause deenergization of the heating unit at the bottom of the tank when the temperature of the water in the bottom of the tank reaches a predetermined high value.

10. A water heater comprising a tank, electric heating units for applying heat to the upper and to the lower end portions only of said tank and a single thermally-actuable switch means jointly dependent upon the temperatures of the water in both said portions only for controlling said heating units so that heat will be applied selectively to said different portions in response to the presence of cold water adjacent to the respective switches.

11. A water heater comprising a tank, electric heating units for applying heat to the upper and to the lower end portions only of the tank, a single thermally-actuable control means for said heating units and a pair of heat-conducting members for jointly and simultaneously affecting said control means in dependence upon the temperature of the water at said respective portions of the tanks only to render the heating unit for each portion ineffective when the water in that portion has reached a predetermined high temperature.

12. A water heater comprising a tank, electric heaters for the top and the bottom portions of the tank, a pair of fixed contacts, a pivotally mounted contact bridging member, a pair of pivotally mounted contacts, over center springs operatively associated with said contact bridging member and said pair of pivotally mounted contacts, a bimetal bar for moving one end of each of said over center springs and a pair of heat-conducting members for conducting heat from the top and the bottom portions of the tank only to said bimetal bar to cause said bridging member to engage said fixed contacts and cause energization of said top heater only when the tank is full of cold water.

13. A water heater comprising a tank, electric heaters for the top and the bottom portions of the tank, a pair of fixed contacts, a pivotally mounted contact bridging member, a pair of pivotally mounted contacts, over center springs operatively associated with said contact bridging member and said pair of pivotally mounted contacts, a creep-type bimetal bar for moving one end of each of said over center springs and a pair of heat-conducting members for conducting heat from the top and the bottom portions only of the tank to said bimetal bar member to cause said bridging to engage said fixed contacts and cause energization of said top heater only when the tank is full of cold water and to move said contact bridging member out of engagement with said fixed contacts and into engagement with said pivotally mounted contacts to effect deenergization of said top heater and energization of said bottom heater when the temperature of the water in the top portion of the tank reaches a predetermined high value.

14. A water heater comprising a tank, electric heaters for the top and the bottom portions of the tank, a pair of fixed contacts, a pivotally mounted contact bridging member, a pair of pivotally mounted contacts, over center springs operatively associated with said contact bridging member and said pair of pivotally mounted contacts, a bimetal bar for moving one end of each of said over center springs and a pair of heat-conducting member for conducting heat from the top and the bottom portions only of the tank to said bimetal bar to cause said bridging member to engage said fixed contacts and cause energization of said top heater only when the tank is full of cold water and to move said contact bridging member out of engagement with said fixed contacts and into engagement with said pivotally mounted contacts to effect deenergization of said top heater and energization of said bottom heater when the temperature of the water in the top portion of the tank reaches a predetermined high value and to move said pivotally mounted contacts out of engagement with said contact bridging member and cause deenergization of said bottom heater when the water in the bottom portion of the tank reaches a predetermined high temperature.

15. A water heater comprising a tank, electric heaters for the top and the bottom portions of the tank, a pair of fixed contacts, a pivotally mounted contact bridging member, a pair of pivotally mounted contacts, over center springs operatively associated with said contact bridging member and said pair of pivotally mounted contacts, a bimetal bar for moving one end of each of said over center springs and a pair of heat-conducting members for conducting heat from the top and the bottom portions only of the tank to said bimetal bar to cause said bridging member to engage said fixed contacts and cause energization of said top heater only when the tank is full of cold water and to move said contact bridging member out of engagement with said fixed contacts and into engagement with said pivotally mounted contacts to effect deenergization of said top heater and energization of said bottom heater when the temperature of the water in the top portion of the tank reaches a predetermined high value and to move said pivotally mounted contacts out of engagement with said contact bridging member and cause deenergization of said bottom heater when the water in the bottom portion of the tank reaches a predetermined high temperature and to move said pivotally mounted contacts into engagement with said contact bridging member to cause reenergization of said bottom heater upon the entrance of a predetermined quantity of cold water into the bottom portion of the tank.

16. A water heater comprising a tank, electric heaters for the top and the bottom portions of the tank, a single thermally-actuable switching means for said electric heaters and a pair of heat-flow-path members, each having a predetermined thermal reluctance, in thermal engagement with the top and the bottom portions only of the tank respectively and jointly affecting said switching means to cause energization of the bottom heater alone in the event that cold water fills the bottom portion of the tank only and to cause deenergization of the bottom heater and energization of the top heater alone in the event that the tank is substantially full of cold water.

17. A water heater comprising a tank, electric heaters for the upper and the lower portions of the tank, a single thermally-actuable switching means for said electric heaters and an upper and a lower heat-flow-path member, in engagement with the top and the bottom portions only of the tank respectively, the thermal reluctance of the upper heat-flow-path being greater than that of the lower heat-flow-path, said two heat flow path members jointly and simultaneously affecting said switching means to cause energization of the top heater alone in case the tank is full of cold water and to cause deenergization of the upper heater and energization of the lower heater alone upon heating of a predetermined amount of water in the upper portion of the tank to a predetermined temperature.

18. In a heater control system for a hot water tank having an upper and a lower electric heater, said system comprising a pair of heat-conducting rods spaced from and extending parallel to the outside wall of the tank, means for securing the upper end of said pair of rods in heat-receiving relation to the upper end only of said tank, means for securing the lower end of said pair of rods in heat-receiving relation to the lower end of said tank, a creep-type bimetal bar secured in heat-receiving relation on the mid-portion of said rods, a single, plural-contact, three-position snap-acting switch operable by said bimetal bar and heat insulation surrounding said rods, said bimetal bar and said switch.

19. In a heater control system for a hot water tank having an upper and a lower electric heater, said system comprising a pair of heat-conducting rods spaced from and extending parallel to the outside wall of the tank, means for securing the upper end of said pair of rods in heat-receiving relation to the upper end only of said tank, means for securing the lower end of said pair of rods in heat-receiving relation to the lower end of said tank, a creep-type bimetal bar secured in heat-receiving relation on the mid-portion of said rods, a single, plural-contact, three-position snap-acting switch operable by said bimetal bar and comprising a pair of fixed contacts, a pair of pivotally mounted contacts, a pivotally mounted contact bridging member, an over center spring for each of said pivotally mounted contacts and bridging member having one end connected to the respective pivotal mountings, means connecting the other ends of said springs to said bimetal bar, increasing flexure of said bimetal bar upon rise of temperature effecting sequential pivotal movement of said pivotally mounted contact bridging member and said pivotally mounted contacts in the same direction and heat insulation surrounding said rods, bimetal bar and switch.

CLARK M. OSTERHELD.